United States Patent

[11] 3,544,783

| [72] | Inventor | Bradford A. Williams, Sr.<br>8231 Driftwood Drive, Norfolk, Virginia 23518 |
|---|---|---|
| [21] | Appl. No. | 761,597 |
| [22] | Filed | Sept. 23, 1968 |
| [45] | Patented | Dec. 1, 1970 |

[54] ARTIFICIAL TREE
10 Claims, 23 Drawing Figs.

[52] U.S. Cl. ............................................. 240/10
[51] Int. Cl. ....................................... A47g 33/06
[50] Field of Search .......................... 240/10, 10(T)

[56] References Cited
UNITED STATES PATENTS

| 2,586,791 | 2/1952 | Dattilo | 240/10 |
| 3,214,579 | 10/1965 | Pacini | 240/10 |
| 3,296,430 | 1/1967 | Eckert | 240/10 |

FOREIGN PATENTS

| 500,455 | 3/1954 | Canada | 240/10 |

Primary Examiner—John M. Horan
Assistant Examiner—Michael Harris
Attorney—J. Maxwell Carson, Jr.

ABSTRACT: A compactly storable artificial Christmas tree including a horizontally disposed base element having a circular periphery; an essentially conical, hollow, vertically sectionalized tree body peripherally superposable on the base element; and a crown element superposable on the tree body. Each tree body section has a circular lower periphery matching the circular upper periphery of the section or element positionable therebeneath, as well as a circular upper periphery smaller in diameter than the circular lower periphery thereof matching the circular lower periphery of the section or element positionable thereabove. The elements and sections of the tree, when superposed, are peripherally restrained against relative lateral movement, and means may also be provided for restraining the same against relative vertical movement. Means for decoratively electrically illuminating the tree are also provided and the wiring therefor is concealed within the tree.

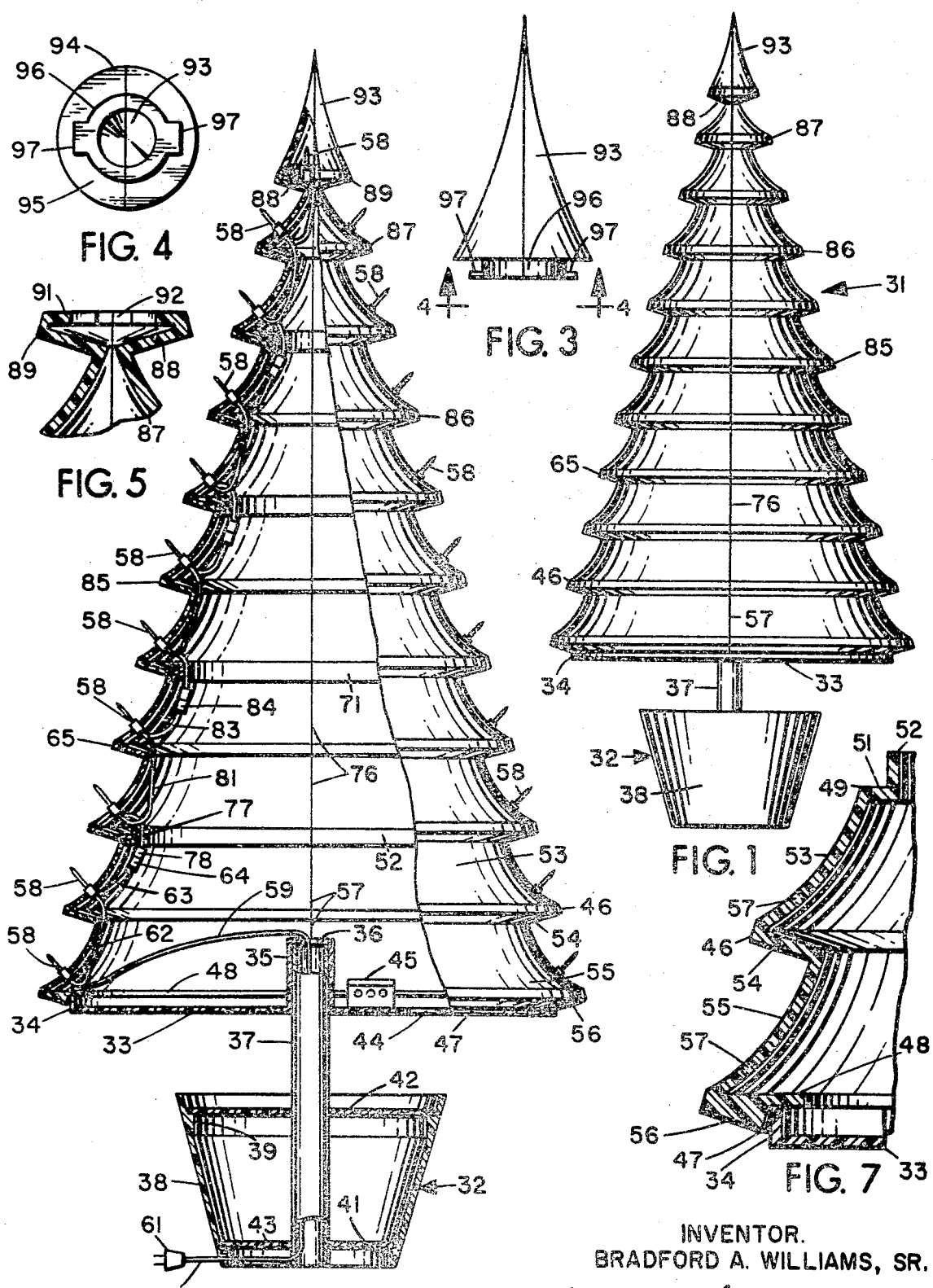

INVENTOR.
BRADFORD A. WILLIAMS, SR.

BY J. Maxwell Carson, Jr.
ATTORNEY

INVENTOR.
BRADFORD A. WILLIAMS, SR.

BY J. Maxwell Carson, Jr.
ATTORNEY

INVENTOR.
BRADFORD A. WILLIAMS, SR.
BY J. Maxwell Carson, Jr.
ATTORNEY 3,544,783

1
ARTIFICIAL TREE

This invention relates generally to an artificial tree, and more particularly to a vertically sectionalized, compactly storable, quickly assembled and disassembled artificial Christmas tree provided with substantially completely concealed means for decoratively electrically illuminating the same.

Artificial trees have been commercially available for some time to those persons who are desirous of purchasing a product that may be used year after year during the Christmas season in lieu of the annual purchase of a natural tree. Some of these presently available artificial trees, and more particularly those manufactured to resemble the natural Scotch pine, are characterized by a quite natural appearance and are capable of being compactly stored in an elongated carton when not in use. Such presently available artificial trees generally include a wooden or plastic "trunk" member which may be secured in an upright position to a suitable base element, and a large number of "branch" members each formed of a pair of intertwisted wires having a great quantity of plastic "bristle" elements in substantially side to side relation. Such trees may be relatively quickly erected by positioning the inner end of each such "branch" member in one of a plurality of downwardly slanting, radially and vertically spaced holes drilled in the upright "trunk" member, and may likewise be relatively quickly disassembled for storage by removing the inner end of each of the "branch" members from the hole in the "trunk" member in which it has been positioned. Such artificial trees, however, in common with the natural trees, require hours of effort to decorate properly in the traditional Christmas season style, and when electrically energized lights are placed thereon, as is usually done, the exposed wires carrying current thereto materially detract from the appearance thereof, regardless of the expenditure of time and effort involved in placing such wiring on the tree in the most inconspicuous manner possible. A recognition of the desirability of providing an artificial tree for the Christmas season that may present a very natural appearance, that does not require hours to properly decorate, and that may be decoratively electrically illuminated in such a manner that the necessary wiring does not adversely affect the appearance thereof, has resulted in the invention of the artificial Christmas tree forming the subject matter of the present application and which, although bearing some superficial resemblance to artificial Christmas trees such as those shown in U.S. Pat. No. 3,219,512 granted on Nov. 23, 1965, to Boris N. Kovacevic, is considered to fill a need not satisfied by the prior art in this field and to overcome many of the drawbacks associated with the use of both natural and prior art artificial Christmas trees as set forth hereinbefore.

Accordingly, an object of the present invention is the provision of a vertically sectionalized, compactly storable, quickly erectable and dismountable, decoratively electrically illuminable artificial Christmas tree carrying no exposed wiring detractable from the appearance thereof.

Another object of the instant invention is the provision of an artificial Christmas tree having a body including a plurality of vertically superposable sections quickly peripherally interconnectable to resist vertical as well as lateral movement therebetween and quickly disconnectable for nested, compact storage.

A further object of the present invention is the provision of a simple and rugged, lightweight, attractive, and relatively inexpensive, vertically sectionalized, compactly storable, artificial Christmas tree carrying electrically energized decorative lights exteriorly on the sections thereof and wiring means therefor interiorly on the sections thereof.

According to the present invention, the foregoing and other objects are obtained by providing an artificial Christmas tree including a horizontally disposed base element having a circular periphery; an essentially frustoconical and tubular lower tree body section peripherally superposable on the base element and having a circular lower periphery as well as a circular upper periphery smaller in diameter than the lower periphery thereof; a plurality of intermediate, sequentially

2 peripherally superposable, essentially frustoconical and tubular tree body sections each having a circular lower periphery matching the circular upper periphery of the tree body section positionable directly therebeneath as well as a circular upper periphery smaller in diameter than the circular lower periphery thereof matching the circular lower periphery of the tree body section positionable directly thereabove; an essentially frustoconical and tubular upper tree body section having a circular lower periphery matching the circular upper periphery of the intermediate tree body section positionable directly therebeneath as well as a circular upper periphery smaller in diameter than the circular lower periphery thereof; and an essentially conical and hollow crown element having a circular lower periphery matching the circular upper periphery of the upper tree body section positionable directly therebeneath. The elements and sections of the tree include means for restraining the same against relative lateral movement when superposed, and when the tree is intended for outdoor use quickly connectable and disconnectable means for restraining the superposed elements and sections thereof against relative vertical movement are also provided thereon. Each body section of the tree may exteriorly carry a plurality of vertically and radially spaced electrically energized decorative lights substantially permanently installed thereon and may likewise interiorly carry substantially permanently installed wires for supplying each of these lights with electrical energy, as well as means for quickly electrically connecting these wires to the wires similarly carried by an adjacent tree body section or sections. Alternatively, the tree may be decoratively illuminated from an electrically energized light source positioned therewithin from which light may be suitably transmitted to the exterior thereof.

A more complete appreciation of the invention and many of the attendant advantages thereof will be readily apparent as the same becomes better understood by reference to the following detailed description when considered in connection with the accompanying drawings wherein:

FIG. 1 is a side elevational view of an assembled artificial Christmas tree according to the present invention shown prior to the placing of decorative light means thereon;

FIG. 2 is an enlarged side elevational view, partially in section, of the artificial Christmas tree of FIG. 1 showing somewhat schematically the placing of electrically energized decorative lights thereon as well as the wiring therefor;

FIG. 3 is a further enlarged side elevational view of the crown element of the artificial Christmas tree of FIGS. 1 and 2;

FIG. 4 is a bottom view of the artificial Christmas tree crown element of FIG. 3, taken along the line 4-4 of FIG. 3;

FIG. 5 is a fragmentary, sectional, side elevational view of the upper tree body section of the artificial Christmas tree of FIGS. 1 and 2 on an enlarged scale;

FIG. 7 is a fragmentary, sectional, side elevational view on a further enlarged scale of the circular base element and the lower tree body section of the artificial Christmas tree of FIGS. 1 and 2 prior to the placing of decorative light means thereon;

Figure 20:
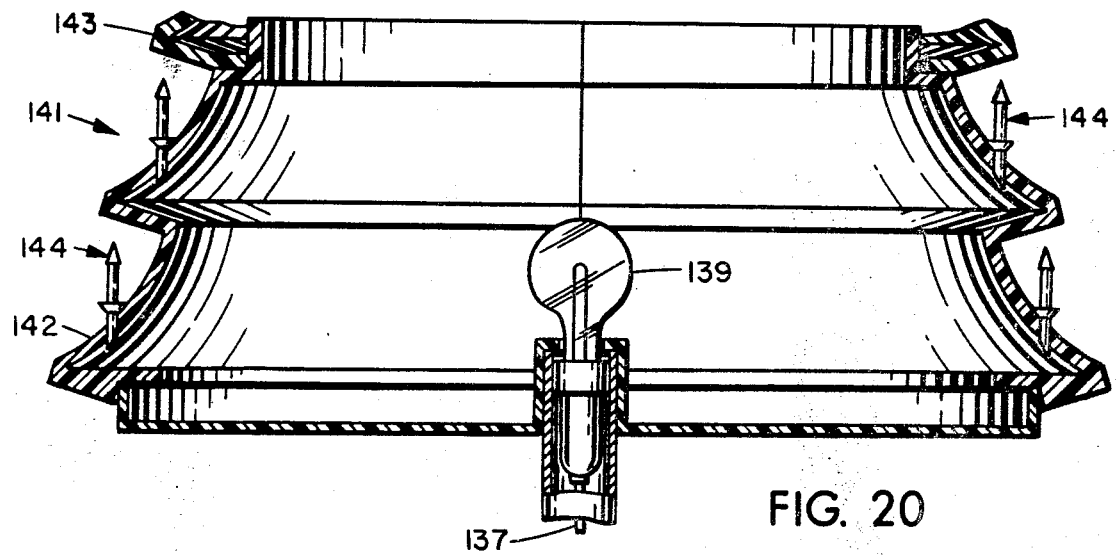
Figure 21:
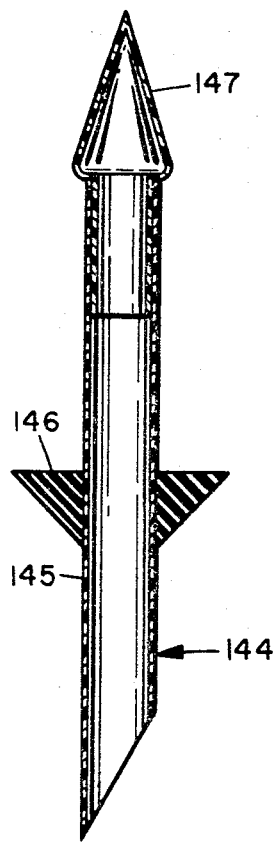
Figure 22:
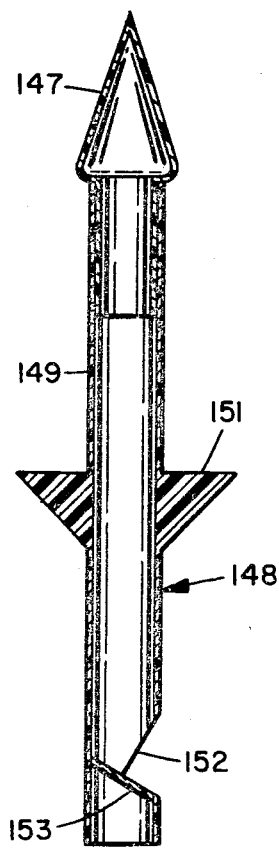
Figure 23:
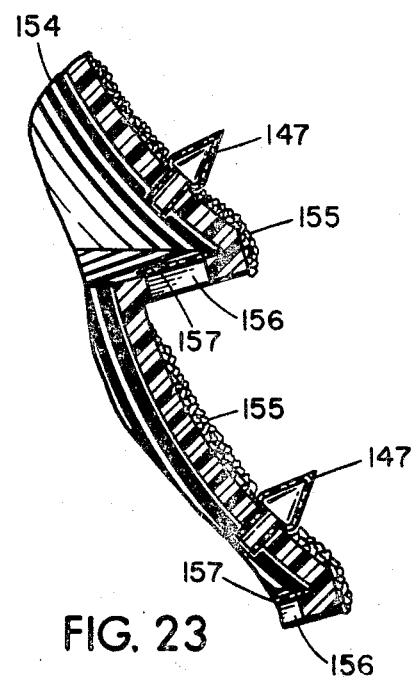

FIG. 20 is a sectional, side elevational view of the circular base element, lower tree body section, and a portion of the lowermost intermediate tree body section of yet another embodiment of the artificial Christmas tree according to the present invention showing an electrically energized light source positioned therewithin a plurality of vertically and radially spaced devices for transmitting light from the interior to the exterior thereof for decoratively illuminating the same;

FIG. 21 is an enlarged, sectional, side elevational view of one of the devices for transmitting light from the interior to the exterior of the artificial Christmas tree of FIG. 20;

FIG. 22 is an enlarged, sectional, side elevational view of another device for transmitting light from the interior to the exterior of the artificial Christmas tree of FIG. 20 useable in lieu of the device shown in FIG. 21; and FIG. 23 is an enlarged, fragmentary, sectional, side elevational view of an intermediate tree body section for the artificial Christmas tree of FIG. 20 carrying still another type of device for transmitting light from the interior to the exterior thereof for decoratively illuminating the same, and further having a coating of material placed on the exterior surface thereof for enhancing the appearance of the same as well as port means formed therethrough for further illuminating the material coating the exterior surface thereof.

Referring now more particularly to the drawings, wherein like reference numerals designate the same or identical parts throughout the several views, and more specifically to FIGS. 1 and 2, there is shown an artificial Christmas tree, generally designated by the reference numeral 31, having a base section, generally designated by the reference numeral 32, including a horizontally disposed base element 33 preferably formed of a suitable plastic material having a circular periphery 34. The base element 33 of tree base section 32 is further integrally centrally provided with an upwardly extending cylindrical sleeve element 35 disposed about a circular opening formed centrally therethrough; the upper extremity of sleeve element 35 integrally carrying an inwardly directed flange 36 of annular configuration encircling an opening into the upper extremity of sleeve element 35. An upper length of a cylindrical, tubular "trunk" member 37 is disposed in the sleeve element 35; the upper extremity of member 37 bearing against the lower surface of the flange 36. The "trunk" member 37 may be formed of a suitable metal, as indicated in the drawings, and coated with a brownish paint to resemble a natural tree trunk, or more preferably may be formed of a brown tinted plastic material having an exterior surface textured to more closely resemble a natural tree trunk.

The base section 32 of artificial Christmas tree 31 is further provided with means for supporting "trunk" member 37 in an upright position. Accordingly, base section 32 includes an essentially tubular element 38 of inverted, frustoconical form internally integrally provided with an upper ledge forming projection 39 and a lower ledge forming projection 41. An upper circular plate element 42 is horizontally disposed within element 38 with the periphery thereof supported by projection 39, and a lower circular plate element 43 smaller in diameter than plate element 42 is also horizontally disposed within element 38 therebelow with the periphery thereof supported by projection 41. Vertically alined circular openings only slightly larger in diameter than the outside diameter of "trunk" member 37 are centrally formed through the circular plate elements 42 and 43, and the lower length of member 37 extends vertically through the alined openings formed through the plate elements 42 and 43 and is supported thereby; the lower extremity of member 37 resting upon the surface upon which element 38 is placed. The element 38 and the circular plates 42 and 43 may be formed of a suitable plastic material, as indicated in the drawings, or of any other suitable material. Sandbags, books, or the like, may be placed upon the circular plate element 43 within element 38 for weighting the tree base section 32 to prevent the inadvertent overturning thereof. A suitable hole or slot is also provided in the cylindrical wall of "trunk" member 37 and in the wall of element 38 below the level of the lower surface of the circular plate element 43 to provide for the passage of an electrical cable therethrough.

The base element 33 of tree base section 32 may also be provided with an opening 44 formed therethrough at a desired point, and a perforated container 45 containing a suitable aromatic substance emitting a "woodsy" odor may be placed on base element 33 adjacent thereto; the aroma passing through opening 44 to permeate the air around artificial Christmas tree 31 and enhance the impression of naturalness thereof.

Referring now to FIG. 7 as well as to FIGS. 1 and 2 of the drawings, it will be seen that artificial Christmas tree 31 includes an essentially frustoconical and tubular lower tree body section 46 peripherally superposable on the base element 33 of tree base section 32. Lower tree body section 46 has a circular lower periphery 47 closely positionable about the circular periphery 34 of base element 33 at a level somewhat lower than the upper edge of circular periphery 34 of base element 33; the tree body section 46 including an inwardly directed annular flange 48 disposed at a level above the lower periphery 47 thereof and adapted to project inwardly over the upper edge of the circular periphery 34 of base element 33 when the tree body section 46 is superposed on the base element 33. Obviously, when the lower tree body section 46 is peripherally superposed on the base element 33 as hereinbefore set forth, relative lateral movement therebetween will be adequately restrained.

Lower tree body section 46 also has a circular upper periphery 49 smaller in diameter than the lower periphery 47 thereof, and includes an inwardly directed annular flange 51 having an upper surface disposed at the level of the upper periphery 49 thereof; the inward edge of flange 51 carrying an upwardly extending sleeve element 52. The flange 51 and the sleeve element 52 are utilized in superposing an intermediate tree body section on the lower tree body section 46, as more fully set forth hereinafter.

The exterior surface of the lower tree body section 46, rather than being precisely of truncated conical form between the lower periphery 47 and the upper periphery 49 thereof, is instead divided into what may aptly be termed an "upper branch tier" and a "lower branch tier" in the interest of naturalness and enhanced eye appeal. The exterior surface of lower tree body section 46 includes a downwardly and outwardly curving portion 53 extending from the upper periphery 49 thereof towards the outer extremity of a downwardly and inwardly projecting step portion 54 disposed at about the vertical midpoint of tree body section 46; the curving portion 53 and step portion 54 making up the "upper branch tier" thereof. The exterior surface of lower tree body section 46 further includes another downwardly and outwardly curving portion 55 extending from the inner extremity of the step portion 54 towards the outer extremity of another downwardly and inwardly projecting step portion 56 having an inner extremity defining the lower circular periphery 47 of lower tree body section 46; the curving portion 55 and step portion 56 making up the "lower branch tier" thereof.

Inasmuch as the lower tree body section 46 is preferably formed of a molded plastic material, or the like, although the use of papier mache shaped by other methods is also contemplated, the configuration thereof set forth hereinbefore would obviously preclude the molding thereof in one piece. Accordingly, lower tree body section 46 may be formed by the joining of two identical "half round" molded components along diametrically opposed lines of juncture 57 when molded plastic or other material is used.

A plurality of radially spaced bores 57 are formed through the curving portions 53 and 55 of the upper and lower branch tiers, respectively, of lower tree body section 46, and a suitable electric light socket carrying a decorative Christmas tree light 58 is positioned in each of the bores 57. It is to be understood that, although only two lights 58 are shown on each tree body section branch tier in FIG. 2 of the drawings in the interest of illustrative clarity, in actual practice many more lights 58 would be carried thereon and electrically interconnected as hereinafter set forth. An electrical cable 59 extends from a conventional double-pronged plug 61 insertable into a conventional electrically energized double-slotted plug socket into the base section 32 of artificial Christmas tree 31 through the holes or slots formed through the element 38 and the member 37 as set forth hereinbefore, and then upwardly through member 37 into the interior of lower tree body section 46 through the opening encircled by the flange 36 of the sleeve element 35 of base element 33. Cable 59 is electrically connected to one of the sockets carrying a light 58 disposed on the lower branch tier of lower tree body section 46, and suitable electrical cable means, not shown in FIG. 2 in the interest of illustrative clarity, are also utilized in electrically connecting the remaining sockets carrying lights 58 disposed on the lower branch tier of lower tree body section 46 in parallel with the light socket to which the cable 59 is connected. Another electrical cable 62 has a lower terminus electrically connected to the light socket to which cable 59 is connected and an upper terminus electrically connected to one of the sockets carrying a light 58 disposed on the upper branch tier of lower tree body section 46, and suitable electrical cable means, not shown in FIG. 2 in the interest of illustrative clarity, are utilized in electrically connecting the remaining sockets carrying lights 58 disposed on the upper branch tier of tree body section 46 in parallel with the light socket thereon to which the cable 62 is connected. It will thus be seen that electrical current flowing through cable 59 is available for electrically energizing all of the decorative Christmas tree lights 58 carried by the lower tree body section 46 on both the upper and lower branch tiers thereof. Moreover, another electrical cable 63 has a lower terminus electrically connected to the light socket to which the upper terminus of cable 62 is connected, as well as an upper terminus electrically connected to a conventional double-slotted plug socket 64 disposed within the lower tree body section 46 near the upper extremity thereof.

Figure 8:
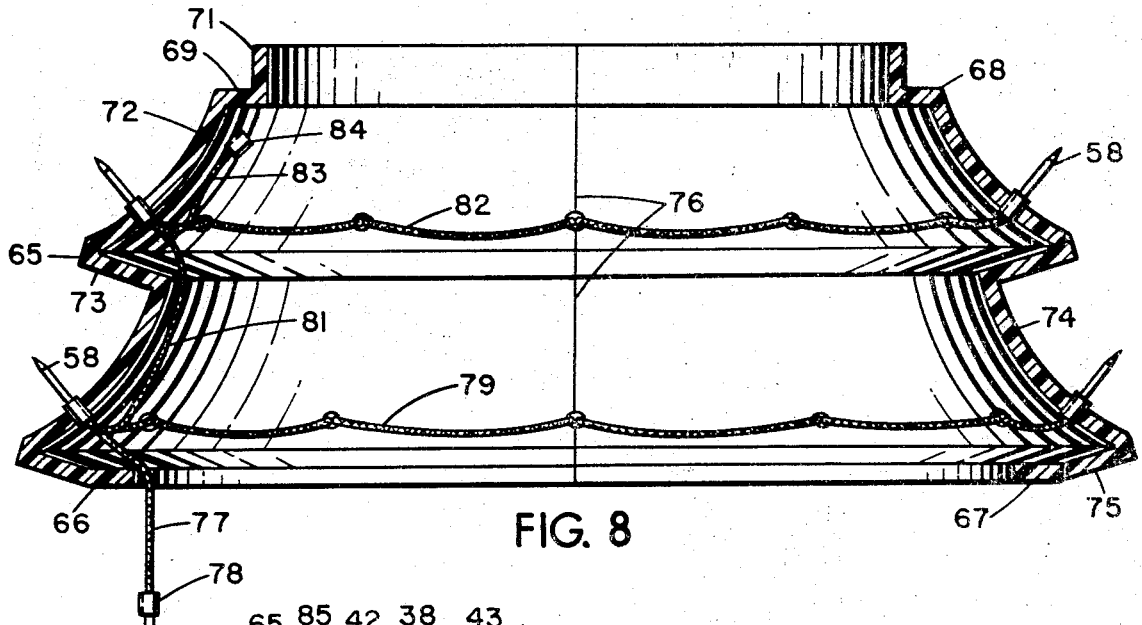
FIG. 8 is a further enlarged, sectional, side elevational view of an intermediate tree body section of the artificial Christmas tree of FIGS. 1 and 2 showing the placing of electrically energized decorative lights thereon and the wiring therefor carried thereby.

Referring now to FIG. 8 as well as to FIGS. 1, 2, and 7 of the drawings, it will be seen that artificial Christmas trees 31 further includes an essentially frustoconical and tubular lowermost intermediate tree body section 65 peripherally superposable on the lower tree body section 46 thereof. Intermediate tree body section 65 has a circular lower periphery 66 diametrically matching the circular upper periphery 49 of lower tree body section 46, as well as an annular flange projecting inwardly therefrom a distance only slightly less than the distance between the upper periphery 49 and the sleeve element 52 of lower tree body section 46. Intermediate tree body section 65 is superposed on the lower tree body section 46 with the lower surface of the flange 67 thereof resting on the upper surface of the flange 51 of lower tree body section 46; the sleeve element 52 of lower tree body section 46 projecting upwardly into intermediate tree body section 65 and adequately restraining relative lateral movement therebetween, as indicated in FIG. 2.

Intermediate tree body section 65 also has a circular upper periphery 68 smaller in diameter than the lower periphery 66 thereof, and includes an inwardly directed annular flange 69 carrying at the inward edge thereof an upwardly extending sleeve element 71 functionally corresponding to the annular flange 51 and the sleeve element 52 carried thereby of lower tree body section 46.

The exterior surface of intermediate tree body section 65 is also divided, similarly to that of the lower tree body section 46, into an upper branch tier made up of the downwardly and outwardly curving portion 72 and the downwardly and inwardly projecting step portion 73, as well as a lower branch tier made up of the downwardly and outwardly curving portion 74 and the downwardly and inwardly projecting step portion 75. The intermediate tree body section 65 is also preferably formed of two "half round" molded plastic components joined together along the diametrically opposed lines of juncture 76.

Intermediate tree body section 65 also carries, on both the upper and lower branch tiers thereof, a plurality of radially spaced light sockets having decorative lights 58 positioned therein similarly to lower tree body section 46. An electrical cable 77 extends upwardly into intermediate tree body section 65 from a conventional double-pronged plug 78 electrically engaged with the double-slotted plug socket 64 disposed within lower tree body section 46; the upper extremity of cable 77 being electrically connected to one of the sockets carrying a light 58 disposed on the lower branch tier of intermediate tree body section 65. Electrical cable means 79 are also utilized in electrically connecting the remaining sockets carrying lights 58 disposed on the lower branch tier of intermediate tree body section 65 in parallel with the light socket to which the cable 77 is connected. Another electrical cable 81 has a lower terminus electrically connected to the light socket to which cable 77 is connected and an upper terminus electrically connected to one of the sockets carrying a light 58 disposed on the upper branch tier of intermediate tree body section 65, and electrical cable means 82 are utilized in electrically connecting the remaining sockets carrying lights 58 disposed on the upper branch tier of intermediate tree body section 65 in parallel with the light socket thereon to which cable 81 is connected. Electrical current flowing through cable 63 of lower tree body section 46 thence into cable 77 is thus available for electrically energizing all of the decorative Christmas tree lights 58 carried by the intermediate tree body section 65 on both the upper and the lower branch tiers thereof. Further, another electrical cable 83 has a lower terminus electrically connected to the light socket to which the upper terminus of cable 81 is connected, as well as an upper terminus electrically connected to a conventional double-slotted plug socket 84 disposed within the intermediate tree body section 65 near the upper extremity thereof.

It is to be noted that the electrical cable means 79 and 82 shown in FIG. 8 have been omitted in FIG. 2 in the interest of clarity in illustration. Further, the electrical cable means hereinbefore mentioned utilized in electrically interconnecting all of the light sockets disposed on the lower as well as on the upper branch tiers of lower tree body section 46, which were also omitted from FIG. 2 in the interest of illustrative clarity, would also have an installed appearance similar to the cable means 79 and 82 shown in FIG. 8.

Artificial Christmas tree 31 further includes a central intermediate tree body section 85 as well an uppermost intermediate tree body section 86. These intermediate tree body sections are formed similarly to the intermediate tree body section 65 and of a similar material, and are otherwise configured similarly thereto except in having the upper and lower circular peripheral diameters, as well as the upper and lower branch tier diameters, necessary to maintain the essentially conical configuration of artificial Christmas tree 31. A plurality of radially spaced lights 58 are likewise positioned on both the upper and the lower branch tiers of intermediate tree body section 85 and intermediate tree body section 86, and wiring means corresponding to that shown in FIG. 8 of the drawings are also provided for electrically interconnecting the lights 58 carried by each of the intermediate tree body sections 85 and 86 as well as for electrically connecting each of the intermediate tree body sections 85 and 86 to the tree body sections positionable directly thereabove and therebeneath. Intermediate tree body section 85 is superposable on and electrically connectable to the lowermost intermediate tree body 65 in the same manner that the lowermost intermediate tree body section 65 is superposable on and electrically connectable to the lower tree body section 46, while intermediate tree body section 86 is similarly superposable on and electrically connectable to intermediate tree body section 85. The foregoing description of the intermediate tree body sections 85 and 86, as well as the showing thereof in FIG. 2 of the drawings, in which the wiring means electrically interconnecting the lights 58 disposed on each of the upper and lower branch tiers thereof have also been omitted in the interest of illustrative clarity, is considered to obviate the necessity for any further description thereof.

Artificial Christmas tree 31 also includes an essentially frustoconical and tubular upper tree body section 87 having a circular lower periphery diametrically matching the circular upper periphery of the uppermost intermediate tree body section 86. Upper tree body section 87 further includes an annular flange projecting inwardly from adjacent the lower periphery thereof similarly to the flange 67 carried by the lowermost intermediate tree body section 65, which is utilized in superposing the upper tree body section 87 on the uppermost intermediate tree body section 86 in the same manner that the lowermost intermediate tree body section 65 is superposed on the lower tree body section 46; the upper tree body section 87 and the uppermost intermediate tree body section 86 being similarly restrained against relative lateral movement. The upper tree body section 87 is also divided into upper and lower branch tiers similarly to the tree body sections hereinbefore described; each of which carries a plurality of radially spaced lights 58 as well as wiring means, not shown in FIG. 2 in the interest of illustrative clarity, electrically interconnecting the lights 58 on the upper branch tier thereof in parallel and electrically interconnecting the lights 58 on the lower branch tier thereof in parallel. The upper tree body section 87 further carries electrical cable means electrically interconnecting the lights 58 carried on the upper branch tier thereof with those carried on the lower branch tier thereof, and also for electrically connecting the upper tree body section 87 to the uppermost intermediate tree body section 86, similarily to the electrical cable means carried by the intermediate tree body section 65 as shown in FIG. 8.

Figure 6:
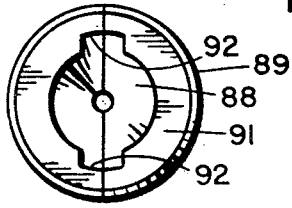
FIG. 6 is a further enlarged, fragmentary plan view of the upper tree body section of the artificial Christmas tree of FIGS. 1 and 2.

Referring now more particularly to FIGS. 5 and 6 as well as to FIG. 2 of the drawings, it will be seen that upper tree body section 87 also includes a third step portion 88 radially upwardly and outwardly projecting from the upper end of the upper branch tier thereof; the circular outer periphery 89 thereof being in substantially conical alinement with the periphery of each of the step portions of the upper and lower branch tiers of the other tree body sections described hereinbefore. The upper tree body section 87 is also provided with an annular flange 91 projecting inwardly from adjacent the outer periphery 89 of step portion 88 thereof; the flange 91 being reduced in width at two diametrically opposed lengths 92 thereof. As shown in FIG. 2 of the drawings, at least one light 58 may be suitably mounted on the upper surface of step portion 88 of upper tree body section 87 to project upwardly beyond the flange 91 thereof; this light 58 being horizontally spaced from the inner rim of flange 91 and being electrically connected in parallel by means of an electrical cable with one of the lights 58 carried by the upper branch tier of upper tree body section 87. The upper tree body section 87 is also preferably formed of two "half round" molded plastic components joined together along two diametrically opposed lines of juncture.

Artificial Christmas tree 31 further includes an essentially conical and hollow crown element 93 preferably formed of a frosted, translucent plastic material made up by the joining of two "half round" components along diametrically opposed lines of juncture, as indicated in FIGS. 3 and 4 as well as in FIG. 2 of the drawings. Crown element 93 has a circular lower periphery 94 diametrically matching the outer diameter of the flange 91 of upper tree body section 87, as well as an annular flange 95 projecting inwardly from the periphery 94 thereof; flange 95 carrying adjacent the inner edge thereof a downwardly projecting, cylindrical sleeve element 96 only slightly smaller in outside diameter than the diameter of the inner rim of the flange 91 of upper tree body section 87. The lower extremity of sleeve element 96 of crown element 93 carries a pair of diametrically opposed, outwardly extending projections 97 conforming in shape to but slightly smaller than the portions cut away from the flange 91 of upper tree body section 87 along the lengths 92 thereof. The crown element 93 is superposable on the upper tree body section 87 by inserting the sleeve element 96 of crown element 93 into the opening encircled by the annular flange 91 of upper tree body section 87, with the projections 97 carried by sleeve element 96 alined with the portions of flange 91 reduced in width along the lengths 92 thereof, and with the cylindrical wall of sleeve element 96 positioned between the inner rim of flange 91 and the light 58 disposed on the step portion 88 of the upper tree body section 87, as shown in FIG. 2. The crown element 93 may then be rotated through about a 90° angle to position the projections 97 thereof beneath portions of the flange 91 of upper tree body section 87 where the width thereof has not been reduced; the crown element 93 thereby being restrained against vertical as well as lateral movement with respect to the upper tree body section 87. The light 58 positioned on the step portion 88 of upper tree body section 87, when electrically energized, produces a decorative glow through the frosted, translucent crown element 93 into which it projects, as indicated in FIG. 2.

Figure 9:
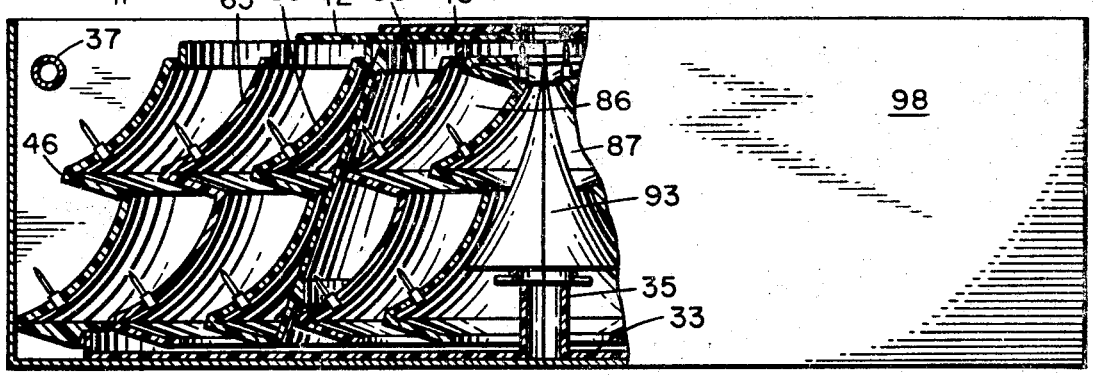
FIG. 9 is a side elevational view, partially in section, of the artificial Christmas tree of FIGS. 1 and 2 disassembled and compactly stored in a carton.

When disassembled, the artificial Christmas tree 31, as shown in FIG. 9 of the drawings, may be stored in a square shaped carton 98 having opposed side walls with interior surfaces spaced only slightly further apart then the maximum diameter of the lower tree body section 46. The base element 33 of the artificial Christmas tree 31 is first placed in carton 98 on the lower wall thereof; the sleeve element 35 of base element 33 projecting upwardly towards the upper edge of carton 98. The crown element 93 of the artificial Christmas tree is next placed in carton 98 with the sleeve element 96 disposed about the upwardly projecting sleeve element 35 of base element 33. The upper tree body section 87 is then concentrically disposed about crown element 93 in carton 98, and the uppermost intermediate tree body section 86 is next concentrically positioned around the upper tree body section 86 in carton 98. The element 38 of the base section 32 of the artificial Christmas tree is next concentrically placed in an inverted position around the uppermost intermediate tree body section 86, and the central intermediate tree body section 85 is then concentrically positioned around the element 38 within the carton 98. The lowermost intermediate tree body section 65 is next concentrically placed about the central intermediate tree body section 85 in carton 98, and then the lower tree body section 46 is concentrically disposed about the lowermost intermediate tree body section 65. The circular plate elements 42 and 43 of tree base section 32 are then placed in carton 98 atop the concentrically nested artificial tree sections and elements, and the "trunk" member 37 thereof is also suitably placed in carton 98, as shown in FIG. 9, on suitable support means, not illustrated, It is to be particularly noted that none of the lights 58 carried by the body sections of artificial Christmas tree 31 need be removed before the same are stored in carton 98 as set forth hereinbefore, and the wiring carried by each of the tree body sections for electrically energizing the lights 58 likewise need not be removed therefrom when the same are stored as shown in FIG. 9 although this wiring is not shown therein in the interest of illustrative clarity. When a suitable cover is placed on carton 98, the artificial Christmas tree 31 may be stored away in a minimum amount of space until again required.

When removed from storage in carton 98, the artificial Christmas tree 31 may be quickly assembled as shown in FIGS. 1 and 2 of the drawings with such ease that the task could be delegated to relatively young children. The element 38 of base section 32 would first be placed on a floor or the like as shown in FIG. 2 of the drawings, and the circular plate elements 42 and 43 positioned therein as hereinbefore set forth. The "trunk" member 37 would then by placed to extend vertically through the central openings formed through the circular plate elements 42 and 43 as hereinbefore described, and the base element 33 of base section 32 would then be mounted on the "trunk" member 37 as shown in FIG. 2. The lower tree body section 46 would then be superposed on base element 33 as hereinbefore described, and the electrical cable connected thereto would next be passed down through "trunk" member 37 and out of base section 32 towards an electrical receptacle, as set forth hereinbefore. The lowermost intermediate tree body section 65 would then be superposed on lower tree body section 46 and the plug 78 and the plug socket 64 electrically connected as shown in FIG. 2. The central intermediate tree body section 85, the uppermost intermediate tree body section 86, and the upper tree body section 87 would then be sequentially assembled and electrically interconnected as set forth hereinbefore and shown in FIG. 2. Finally, the crown element 93 would be superposed on and interconnected with the upper tree body section 87 as shown in FIG. 2, and the plug 61 could then be plugged into an electrical receptacle, causing all of the decorative lights 58 carried by artificial Christmas tree 31 to come on. The artificial Christmas tree 31 could then be used without further adornment, although such could then be added thereto, if desired, as hereinafter set forth.

Figure 10:
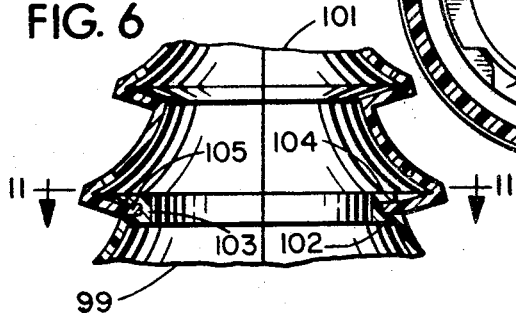
FIG. 10 is a sectional, side elevational view of two superposed body sections of the artificial Christmas tree as shown in FIGS. 1 and 2 further including means for peripherally interconnecting the same to prevent relative vertical movement therebetween.
Figure 11:
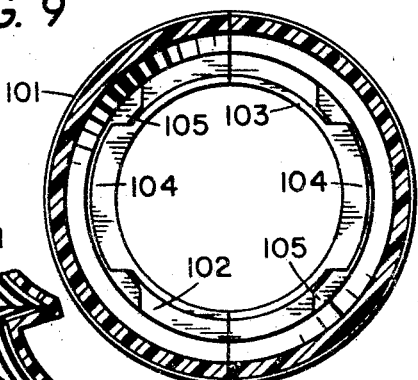
FIG. 11 is a sectional, plan view of the means vertically interconnecting the tree body sections of FIG. 10, taken along the line 11-11 of FIG. 10.
Figure 12:
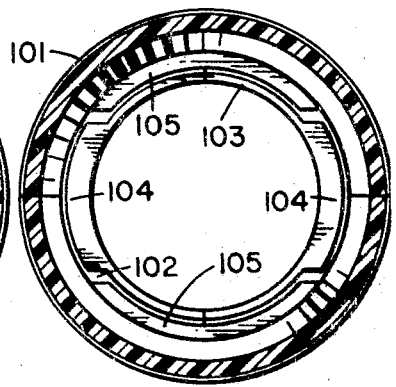
FIG. 12 is a view similar to FIG. 11 but with the uppermost of the two tree body sections shown therein rotated through a 90° angle to permit vertical disengagement of the same.

The lower tree body section of an artificial Christmas tree such as that hereinbefore described could be interconnected with the base element thereof to resist relative vertical movement therebetween, if desired, and all of the tree body sections thereof could also be connected each to the other for the same purpose through the use of quickly disengageable and engageable locking means such as that shown, by way of example, in FIGS. 10—12 of the drawings. The lower of the two tree body sections 99 and 101 shown in FIG. 10 could correspond to the tree body section 65 of artificial Christmas tree 31, for example; this tree body section 99 having an inwardly directed annular flange 102 corresponding to the flange 69 of the tree body section 65 as well as an upwardly extending sleeve element 103 carried on the inner edge of flange 102 corresponding to the sleeve element 71 of tree body section 65. The upper edge of sleeve element 103 of tree body section 99 carries a pair of diametrically opposed, outwardly projecting, annular flange portions 104; each flange portion 104 extending around somewhat less than a quarter of the outer circumference of sleeve element 103. The upper of the two tree body sections shown in FIG. 10 could correspond, for example, to the tree body section 85 of artificial Christmas tree 31; this tree body section 101 having a pair of diametrically opposed, inwardly projecting, annular flange portions 105 each extending through about a quarter of a circle and somewhat corresponding to the annular flange disposed adjacent the lower circular periphery of tree body section 85. When the tree body section 101 is superposed on the tree body section 99, with the flange portions 105 of tree body section 101 resting upon the flange 102 of tree body section 99, the flange portions 105 of tree body section 101 may extend beneath the flange portions 104 carried by the sleeve element 103 of tree body section 99, as particularly shown in FIG. 11 as well as in FIG. 10 of the drawings, thereby interconnecting the tree body sections 99 and 101 against relative vertical as well as relative lateral movement. The tree body sections 99 and 101 may be disassembled by rotating the tree body section 101 relative to tree body section 99 from the position set forth hereinbefore through a 90° angle to the position shown in FIG. 12, thereby disengaging the flange portions 104 and 105 to permit the tree body section 101 to be vertically moved away from the tree body section 99. As mentioned hereinbefore, the same or similar quickly engageable and disengageable locking means may be used for the interconnection of other sections and elements of an artificial Christmas tree according to the present invention.

Figure 13:
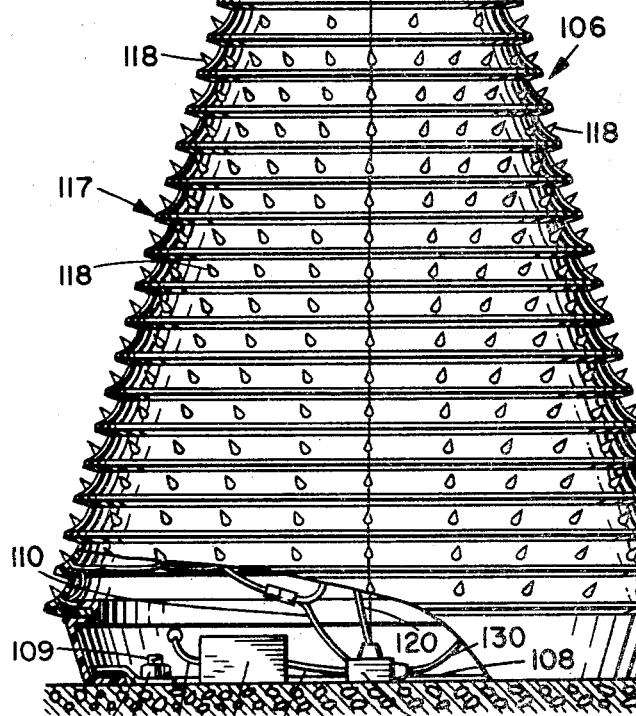
FIG. 13 is a side elevational view, partially in section, of another embodiment of the artificial Christmas tree according to the instant invention particularly adapted for outdoor use.

The artificial Christmas tree 31 hereinbefore described is intended primarily for indoor use, but other artificial Christmas trees adapted for outdoor use also fall within the scope of the instant invention. One large artificial Christmas tree, generally designated by the reference numeral 106, primarily adapted for outdoor use by a commercial enterprise, a municipality, or the like, is accordingly shown in FIG. 13 of the drawings. Artificial Christmas tree 106 includes an essentially frustoconical and tubular base element 107 provided adjacent the lower circular periphery thereof with an inwardly directed annular flange 108. Artificial Christmas tree 106 may be placed on an outdoor surface paved with concrete, as indicated in FIG. 13, or on any other suitable surface. A concrete slab such as that shown in FIG. 13 may be provided with at least two large bolts 109, only one of which is visible in FIG. 13, partially embedded therein in a head down position with a threaded length thereof projecting upwardly beyond the upper surface of the concrete slab. A first flat section of a clip element 111 having a bore formed therethrough is placed on the concrete surface with the threaded length of a first bolt 109 projecting upwardly through this bore, and a second flat section of clip element 111 disposed parallelly to but offset from the first flat section thereof is disposed to horizontally project over the flange 108 of base element 107. When a nut 112 is turned down on the upwardly projecting threaded length of the bolt 109 into contact with the clip element 111, the artificial tree base element 107 is thereby securely anchored to the concrete slab in the vicinity of this clip element 111. The second bolt 109 is used for similarly anchoring the base element 107 of artificial Christmas tree 106 to the concrete slab at another point by means of another clip element 111 and another nut 112; this second bolt 109 being positioned with respect to the first bolt 109 so that the base element 107 is anchored to the concrete slab at diametrically opposed points. Obviously, the artificial tree base element 107 may further be similarly anchored to the concrete slab at as may many more points as may be deemed desirable. Further, other means analogous to that set forth hereinbefore may be utilized in anchoring the artificial Christmas tree base element 107 to other types of surfaces.

An opening is formed through the tubular wall of artificial Christmas tree base element 107 and an electrical cable 113 having an outside terminus connected to a high voltage, alternating current source is passed into the base element 107 therethrough. The terminus of cable 113 within base element 107 is connected to the input terminals of a conventional step down transformer 114, and an electrical cable 115 having one terminus connected to the output terminals of transformer 114 has the other terminus thereof connected to a conventional gang receptacle box 116 into which a plurality of electrical cables may be plugged for the purpose set forth hereinafter.

Artificial Christmas tree 106 includes a vertically sectionalized tree body assembly, generally designated by the reference numeral 117, made up of a plurality of tree body sections similar in design and function to the tree body sections of the artificial Christmas tree 31 as set forth hereinbefore, and which may also be nested, together with base element 107, for compact storage. Artificial Christmas tree 106 also includes a crown element 93 identical to that of artificial Christmas tree 31. All of the adjoining sections and elements of artificial Christmas tree 106 are peripherally restrained against relative vertical as well as relative lateral movement by the provision thereon and interengagement thereof of quickly engageable and disengageable locking means such as shown FIGS. 10—12 of the drawings; the securely anchored and securely assembled artificial Christmas tree 106 thereby being adapted to readily withstand wind and other live loads to which it may be subjected. Each body section of artificial Christmas tree 106 also carries, on both the upper and the lower branch tiers thereof, a plurality of radially spaced, electrically energized, decorative lights 118, as well as wiring means for electrically energizing the same similar to the wiring means carried by the tree body sections of artificial Christmas tree 31 for electrically energizing the decorative lights 58 placed thereon. Inasmuch as the artificial Christmas tree 106, which includes a total of fifteen tree body sections, may carry hundreds of decorative lights 118, it is not considered feasible to attempt to connect all of the same in parallel with a single electrical cable running up through the body assembly 117 of artificial Christmas tree 106. Accordingly, one electrical cable 110 carrying current for electrically energizing, for example, the decorative lights 118 carried by the tree body sections making up a lower portion of tree body assembly 117, may be plugged into the gang receptacle box 116; and other electrical cables 120 and 130 could also be plugged into gang receptacle box 116 to similarly carry current to other portions of the tree body assembly 117 for electrically energizing the decorative lights 118 carried by the tree body sections thereof.

Figure 14:
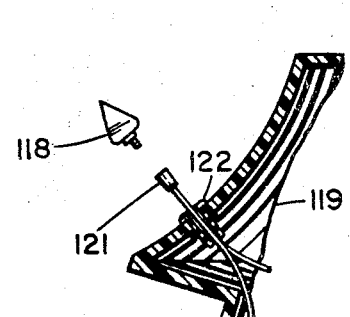
FIG. 14 is an enlarged, fragmentary, sectional, side elevational view of one of the intermediate body sections of the artificial Christmas tree of FIG. 13 showing the installation of the electrically energized decorative lights thereon and the wiring therefor.
Figure 15:
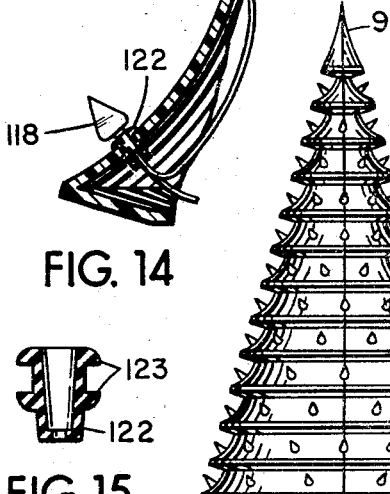
FIG. 15 is a further enlarged, sectional, side elevational view of one of the light socket mounting devices shown in FIG. 14.

A fragmentary view of a tree body section 119 of artificial Christmas tree 106 is shown in FIG. 14 of the drawings illustrating the preferred means for mounting the lights 118 thereon. Bores similar to the bores 57 formed through the tree body sections of artificial Christmas tree 31 are formed through the upper and lower branch tiers of the tree body section 119 at radially spaced intervals. A socket 121 for each light 118 having electrical cables connected thereto having threaded thereon a flexible light socket insert 122 is passed from the interior to the exterior of tree body section 119 through each of the bores formed therethrough. Each light socket insert 122, as shown in detail in FIG. 15, is preferably formed of rubber or the like, and is essentially cup shaped, having an interior in which a light socket 121 may be tightly seated. The inner end of each socket insert 122 is provided with an opening through which the wires connected to a socket 121 may pass, and the outer end of each light socket insert 122 is exteriorly provided with a pair of longitudinally spaced annular projections 123 by means of which the light socket insert 122 may be seated grommet fashion in a bore formed through the tree body section 119. A light socket insert 122 is seated in each bore formed through tree body section 119, and a light socket 121 is seated therein, as shown in FIG. 14, into which a decorative light 118 is placed. The electrical cables projecting from each socket 121 through the end opening of a light socket insert 122 are then secured in any desired conventional manner to the interior of the tree body section 119. The socket inserts 122, in addition to providing a secure mount for the light sockets 121, also serve to bar the passage of rain water and the like into the interior of artificial Christmas tree 106.

Each of the sections and elements of artificial Christmas tree 106, similarly to those of artificial Christmas tree 31, are also preferably formed of two identical "half round" molded plastic components joined together along two diametrically opposed lines of juncture, as indicated in FIG. 13.

Figure 16:
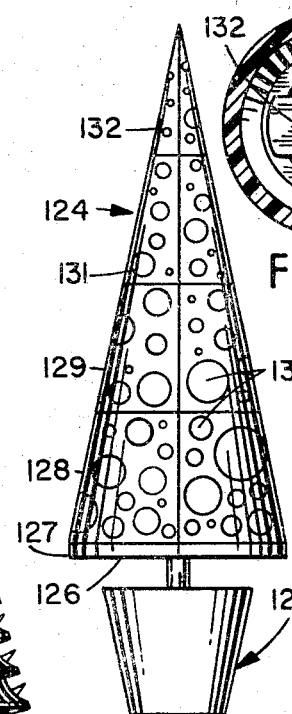
FIG. 16 is a side elevational view of still another embodiment of the artificial Christmas tree according to the present invention also particularly adapted for outdoor use.

Still another artificial Christmas tree according to the instant invention adapted primarily for outdoor residential use, and generally designated by the reference numeral 124, is shown in FIG. 16 of the drawings. Artificial Christmas tree 124 includes a base section, generally designated by the reference numeral 125, generally similar to the base section 32 of artificial Christmas tree 31. Artificial tree base section 125 includes a horizontally disposed base element 126 having a circular periphery 127 differing from that of the base element 33 of base section 32 of artificial Christmas tree 31 only by being provided with means for vertically as well as laterally peripherally interlocking a superposed tree body section thereto. In fact, this modification of the circular periphery of the base element thereof constitutes the only major structural difference between the base section 125 of artificial Christmas tree 124 and the base section 32 of artificial Christmas tree 31.

Artificial Christmas tree 124 further includes a frustoconical and tubular lower tree body section 128, two frustoconical and tubular intermediate tree body sections 129 and 131, and a conical and hollow crown element 132. The exterior of the tree body sections 128, 129, 131 and crown element 132 of artificial Christmas tree 124 may have a number of thin, brightly colored, plastic appliques 133 of various shaped and sizes exteriorly attached thereto as by adhesive bonding or the like for the purpose of giving the same a decorated appearance during the hours of daylight when electrical illumination thereof as hereinafter set forth is not contemplated.

Figures 18, 19:
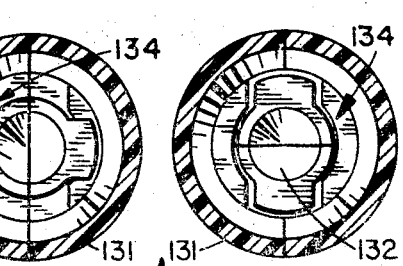
FIG. 18 is an upwardly looking view of the means peripherally vertically interconnecting the uppermost body section and the crown element of the artificial Christmas tree of FIGS. 16 and 17, taken along the line 18-18 of FIG. 17.
FIG. 19 is a view similar to FIG. 18 but with the crown element of the artificial Christmas tree of FIGS. 16 and 17 rotated through a 90° angle to permit vertical disengagement thereof from the uppermost body section of this artificial Christmas tree.
Figure 17:
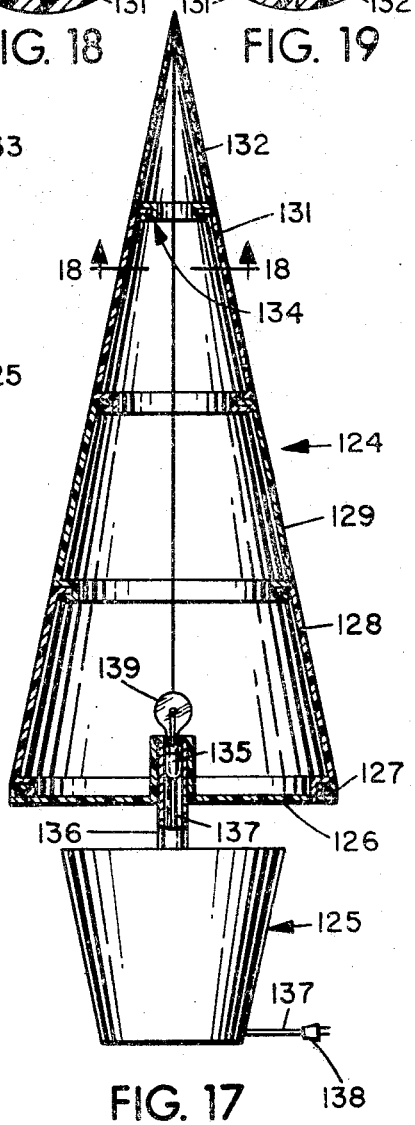
FIG. 17 is an enlarged, sectional, side elevational view of the artificial Christmas tree of FIG. 16 showing an electrically energized light source positioned therewithin for decoratively illuminating the same.

Referring now to FIGS. 17—19 as well as to FIG. 16 of the drawings, it will be seen that the crown element 132 of artificial Christmas tree 124 is likewise peripherally interlocked against relative vertical as well as relative lateral movement with the uppermost intermediate tree body section 131 thereof. The quickly engageable and disengageable locking means, generally designated by the reference numeral 134, utilized in so interlocking crown element 132 to tree body section 131 is exactly the same although used in an inverted position as the locking means used in peripherally interlocking the tree body sections 99 and 101 shown in FIGS. 10—12 of the drawings; as will be readily apparent from an inspection of FIGS. 17 and 18 showing the engagement of locking means 134, and by inspection of FIG. 19 showing crown element 132 rotated through a 90° angle with respect to the tree body section 131 for the disengagement of the locking means 134. Further discussion of locking means 134 is not considered necessary herein in view of the detailed description of the means for peripherally interlocking the tree body sections 99 and 101 hereinbefore set forth.

The uppermost intermediate tree body section 131 of artificial Christmas tree 124 is peripherally interlocked against relative vertical as well as relative lateral movement with the lowermost intermediate tree body section 129 thereof through the use of means similar to locking means 134; the lowermost intermediate tree body section 129 of artificial Christmas tree 124 is similarly interconnected with the lower tree body section 128 thereof; and the lower tree body section 128 of artificial Christmas tree 124 is similarly peripherally interconnected with the base element 126 of the base section 125 thereof, as shown in FIG. 17 of the drawings.

The base element 126 of base section 125 of artificial Christmas tree 124 is formed of two identical "half round" molded components made of a plastic material similar to that used in the construction of artificial Christmas tree 31 and joined together along a line of juncture. The crown element 132 as well as the tree body sections 128, 129, and 131 of artificial Christmas tree 124 are each likewise formed of two identical "half round" components joined together along two diametrically opposed lines of juncture, as indicated in FIGS. 16 and 17; the plastic material forming crown element 132 and the tree body sections 128, 129, and 131, however, being translucent and tinted a dark green color for the purpose hereinafter set forth.

Artificial Christmas tree 124 further includes an upwardly opening electric light bulb socket 135 mounted within and just beneath the upper extremity of "trunk" member 136 of base section 125 thereof; an electrical cable 137 extending down "-trunk" member 136 therefrom and thence out of artificial tree base section 125. The terminus of electrical cable 137 remote from artificial tree base section 125 is connected to a conventional double-pronged plug 138 electrically insertable into a conventional electrical receptacle socket. A strong electric light bulb 139 is screwed into socket 135 which, when electrically energized, lights up the interior of artificial Christmas tree 124; this light glowing through the translucent walls of crown element 132 as well as the tree body sections 128, 129, and 131 thereof to decoratively electrically illuminate the same during the hours of darkness.

FIG. 20 is a fragmentary view of yet another artificial Christmas tree according to the present invention, generally designated by the reference numeral 141, having a base section identical to that of the artificial Christmas tree 31. The artificial Christmas tree 141 also includes a crown element 93 identical to that hereinbefore described as well as a plurality of tree body sections such as a lower tree body section 142, a lowermost intermediate tree body section 143, and so forth, substantially identical to those of artificial Christmas tree 31 except for having vertically disposed bores formed through both the upper and the lower branch tiers thereof rather than slanting bores such as the bores 57 shown in FIG. 7. Candle simulating decorative light elements, generally designated by the reference numeral 144, placed in the vertical bores formed through the upper and lower branch tiers of the tree body sections of artificial Christmas tree 141 are capable, as more fully set forth hereinafter, of transmitting light from an electrically energized light source positioned in the interior of artificial Christmas tree 141 to the exterior thereof. The artificial Christmas tree 141, of course, carries no electrically energized lamps exteriorly positioned thereon, nor any wiring means with the exception of an electrical cable 137 utilized in electrically energizing a strong electric light bulb interiorly positioned therein in the same manner that the light bulb 139 is mounted within the artificial Christmas tree 124.

The decorative light elements 144, as more completely shown in FIG. 21, include a cylindrically shaped, tubular member 145 having a slanting lower terminus exposing a portion of the interior surface thereof directly to the electric light bulb 139, An annular member 146 preferably formed of rubber or the like is snugly disposed about the member 145 at about the vertical midpoint thereof and is utilized in mounting the element 144 on an artificial Christmas tree as shown in FIG. 20. A hollow, flame shaped, glow device having an open lower end and designated by the reference numeral 147 preferably formed of a translucent plastic tinted in one of a plurality of colors is mounted upon the upper extremity of tubular member 145. A portion of the light from the electric light bulb 139 positioned within artificial Christmas tree 141 striking the interior surface of the tubular member 145, which should be coated with a highly light reflective material such as a white enamel paint, would be deflected up the interior thereof into the interior of glow device 147 to give the portion of the element 144 positioned exteriorly on artificial Christmas tree 141 the appearance of a burning candle, thereby decoratively illuminating the artificial Christmas tree 141.

Another type of decorative light element, generally designated by the reference numeral 148, and useable in lieu of the decorative light element 144, is shown in FIG. 22 of the drawings. Element 148 includes a tubular member 149 corresponding to member 145 preferably formed of a plastic material and having an integrally formed annular projection 151 corresponding to the annular member 146 carried by member 145. A suitable opening 152 is formed in the cylindrical wall of tubular member 149 adjacent a mirror 153 mounted therein in a sloping attitude. The tubular member 149 also carries a glow device 147 mounted upon the upper end thereof similarly to the mounting of glow device 147 upon tubular member 145 of light element 144. Light from the electric light bulb 139 positioned within the artificial Christmas tree 141 would strike mirror 153 and be reflected thereby up the interior of tubular member 149 into the glow device 147, producing an effect similar to but more brilliant than that produced by the decorative light element 144.

Another type of decorative light device that could be adapted for use with the artificial Christmas tree 141 in lieu of the decorative light devices herein disclosed is shown in U.S. Pat. No. 2,125,906 granted on Aug. 9, 1938 to John Frei, Jr. and particularly set forth in FIG. 2 of the drawings thereof.

As shown in FIG. 23 of the drawings, the tree body sections of an artificial Christmas tree such as that shown in FIG. 20 could be further treated to enhance the appearance thereof. The tree body section 154 fragmentarily shown in FIG. 23 may be externally coated with a great number of white colored particles 155 of various sizes adhesively bonded thereto to simulate the appearance of snow. Such particles 155 ideally may be produced by grating, flaking, and chipping the same from masses of foamed plastic of the proper color. A number of radially spaced ports 156 cut through the step portions of the upper and lower branch tiers of such tree body sections and closed by panels 157 formed of translucent, blue tinted plastic would further enhance the appearance thereof, since the light coming therethrough from the artificial Christmas tree interior and impinging on the particles 155 would effectively simulate the gleam of moonlight on snow laden natural tree branches. It will also be noted that the glow devices 147 hereinbefore set forth may also be placed directly in suitable bores formed through the tree body section 154 for transmitting light from the interior to the exterior of an artificial Christmas tree and decoratively electrically illuminating the same.

Suitable hook elements, not illustrated in the drawings, may also be placed on the lower surfaces of the upper and lower branch tier step portions of the tree body sections for artificial Christmas trees herein disclosed from which ornamental balls and the like may be hung, and which may further be utilized in festooning such an artificial Christmas tree with flexible, elongated, ornamental garlands and the like.

Obviously, many modifications and variations of the present invention are possible in the light of the foregoing teachings. It is therefore to be understood that within the scope of the appended claims the invention may be practiced otherwise than as specifically described.

I claim:

1. A compactly storable artificial tree, comprising:
a base element having a substantially circular periphery;
an essentially conical, hollow, vertically sectionalized tree body assembly peripherally superposed on said base element, said tree body assembly including at least a first essentially frustoconical and tubular tree body section having a lower periphery diametrically matching said periphery of said base element and peripherally superposed on said base element, said first tree body section having an at least partially annular, operationally substantially horizontally disposed lower surface situated adjacent said lower periphery thereof peripherally contacting said base element and transferring thereto the entire weight of all of the components of said artificial tree situated above said base element, said first tree body section further being somewhat snugly vertically telescoped relative to said base element and thereby restrained against at least lateral movement with respect thereto, said tree body assembly further including at least a second essentially frustoconical and tubular tree body section having a lower periphery diametrically matching an upper periphery of said first tree body section and peripherally superposed on said first tree body section, said second tree body section having an at least partially annular, operationally substantially horizontally disposed lower surface situated adjacent said lower periphery thereof peripherally contacting said upper periphery of said first tree body section and transferring thereto the entire weight of all of the components of said artificial tree situated above said first tree body section, said second tree body section being somewhat snugly vertically telescoped relative to said first tree body section and thereby restrained against at least lateral movement with respect thereto;

a crown element somewhat snugly vertically telescopically superposed on the uppermost of said tree body sections and thereby restrained against at least lateral movement with respect thereto; and means for electrically decoratively illuminating said artificial tree.

2. The artificial tree according to claim 1, wherein said means for electrically decoratively illuminating said artificial tree includes a plurality of electrically energized lights mounted exteriorly on each of said tree body sections, and wherein wiring means are internally carried by each of said tree body sections for electrically interconnecting each of said lights mounted exteriorly thereon; each of said tree body sections further carrying means for quickly electrically interconnecting said wiring carried thereon with the wiring carried by each other tree body section disposed adjacent thereto, and wherein said wiring carried by one of said tree body sections includes an electrical cable quickly interconnectable with a source of electrical energy.

3. The artificial tree according to claim 2, including means for peripherally interconnecting said first tree body section and said base element against relative vertical movement when said somewhat snugly vertically telescoped first tree body section and said base element have been rotated relative to each other about their operationally vertical axis through a portion of a circle, as well as means for peripherally interconnecting said second tree body section and said first tree body section against relative vertical movement when said somewhat snugly vertically telescoped second tree body section and said first tree body section have been rotated relative to each other about their operationally vertical axis through a portion of a circle, and further including means for interconnecting said crown element and said uppermost tree body section against relative vertical movement when said somewhat snugly vertically telescoped crown element and said uppermost tree body section have been rotated relative to each other about their operationally vertical axis through a portion of a circle.

4. The artificial tree according to claim 3, wherein each of said tree body sections include an upper branch tier and a lower branch tier, the lower edge of each of said branch tiers being located substantially adjacent the outer surface of the overall conical outline of said artificial tree, the outer surface of each of said branch tiers substantially sloping inwardly and upwardly from said overall conical outline of said artificial tree, and wherein a portion of said lights carried thereby are radially spaced on said upper branch tier thereof a distance above the lower edge thereof and the remainder of said lights carried thereby are disposed on said lower branch tier thereof a distance above the lower edge thereof, said lights thereby being adapted to be disposed substantially within the overall conical outline of said artificial tree thereby facilitating the compact storage thereof.

5. The artificial tree according to claim 1, wherein said means for electrically decoratively illuminating said artificial tree includes an electrically energized light source disposed within said body assembly thereof, and wherein said crown element and said tree body sections are formed of a translucent plastic material through which light emitted from said light source may pass for the decorative illumination of said artificial tree.

6. The artificial tree according to claim 5, including means for peripherally interconnecting said first tree body section and said base element against relative vertical movement when said somewhat snugly vertically telescoped first tree body section and said base element have been rotated relative to each other about their operationally vertical axis through a portion of a circle, as well as means for peripherally interconnecting said second tree body section and said first tree body section against relative vertical movement when said somewhat snugly vertically telescoped second tree body section and said first tree body section have been rotated relative to each other about their operationally vertical axis through a portion of a circle, and further including means for interconnecting said crown element and said uppermost tree body section against relative vertical movement when said somewhat snugly vertically telescoped crown element and said uppermost tree body section have been rotated relative to each other about their operationally vertical axis through a portion of a circle.

7. The artificial tree according to claim 1, wherein said means for electrically decoratively illuminating said artificial tree includes an electrically energized light source disposed within said body assembly thereof, and wherein a plurality of tubular light element members are mounted on each of said tree body sections through which light may pass from the interior of said tree body assembly to the interior of a hollow, translucent glow device mounted on an extremity of each of said tubular light element members disposed exteriorly of said tree body assembly.

8. The artificial tree according to claim 7, wherein each of said tubular light element members includes a mirror mounted internally therein for maximizing the transmission of light therethrough.

9. The artificial tree according to claim 7, wherein said tree body sections are provided with ports for transmitting light from the interior to the exterior thereof.

10. The artificial tree according to claim 7, wherein each of said tree body sections include an upper branch tier and a lower branch tier, the lower edge of each of said branch tiers being located substantially adjacent the outer surface of the overall conical outline of said artificial tree, the outer surface of each of said branch tiers substantially sloping inwardly and upwardly from said overall conical outline of said artificial tree, and wherein a portion of said tubular light element members mounted thereon are radially disposed on said upper branch tier thereof a distance above the lower edge thereof and the remainder of said tubular light element members mounted thereon are disposed on said lower branch tier thereof a distance above the lower edge thereof, said tubular light element members thereby being adapted to be disposed substantially within the overall conical outline of said artificial tree thereby facilitating the compact storage thereof.